July 2, 1935.  R. LAPSLEY  2,006,398
MEANS FOR PREVENTING RETROGRADE MOTION OF AN AUTOMOBILE
Filed Sept. 28, 1929  3 Sheets-Sheet 1
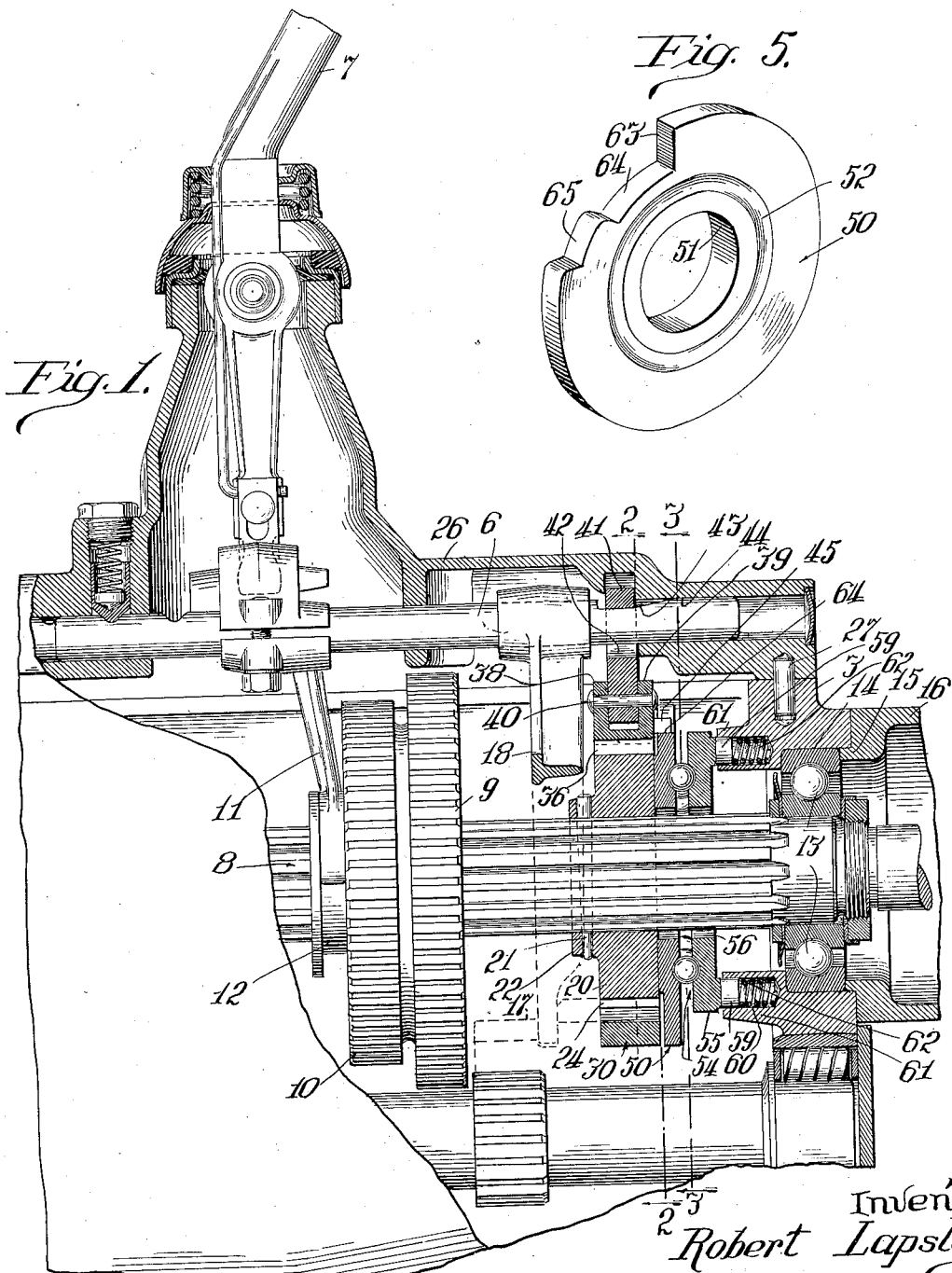

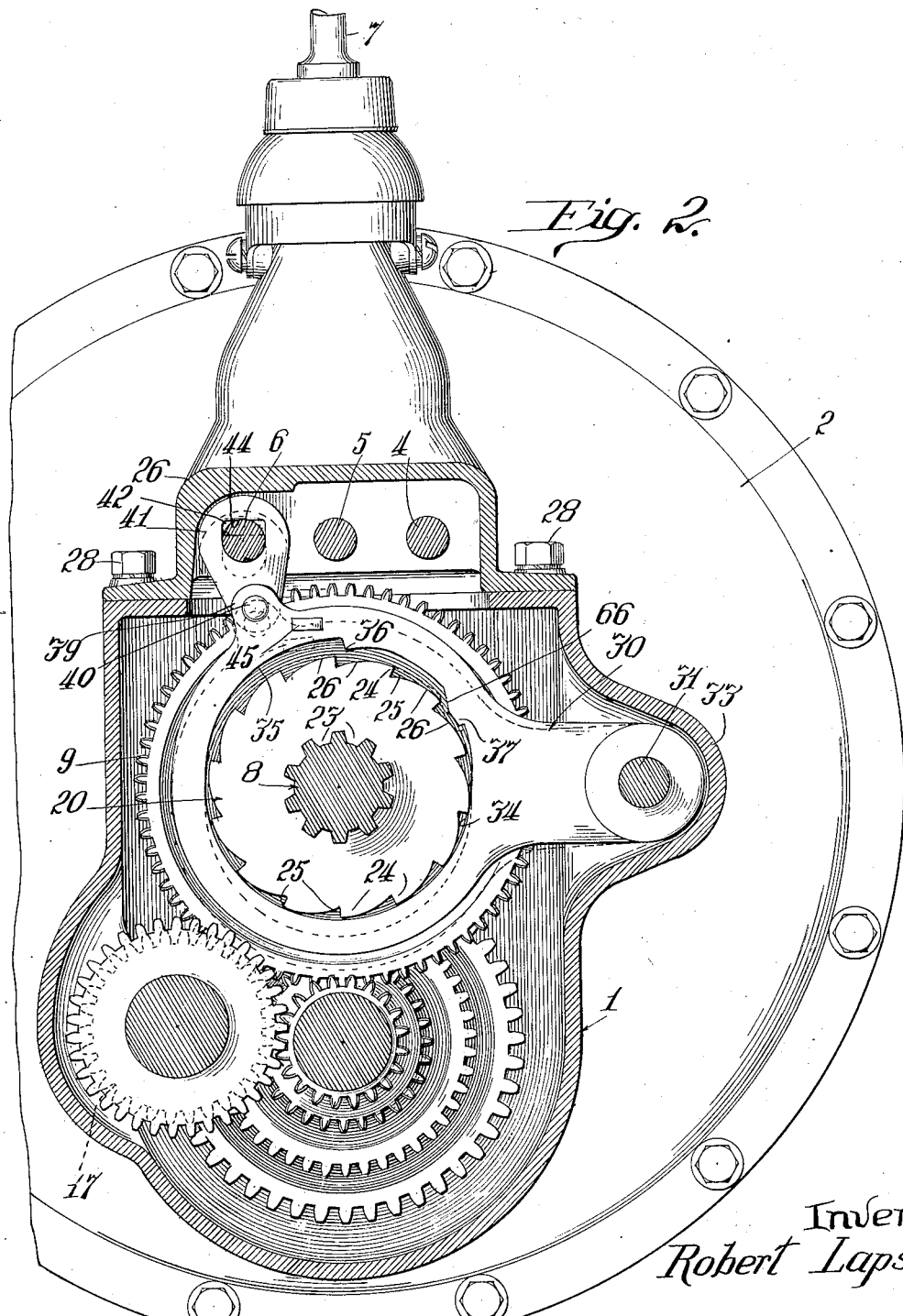

July 2, 1935.  R. LAPSLEY  2,006,398
MEANS FOR PREVENTING RETROGRADE MOTION OF AN AUTOMOBILE
Filed Sept. 28, 1929   3 Sheets-Sheet 3
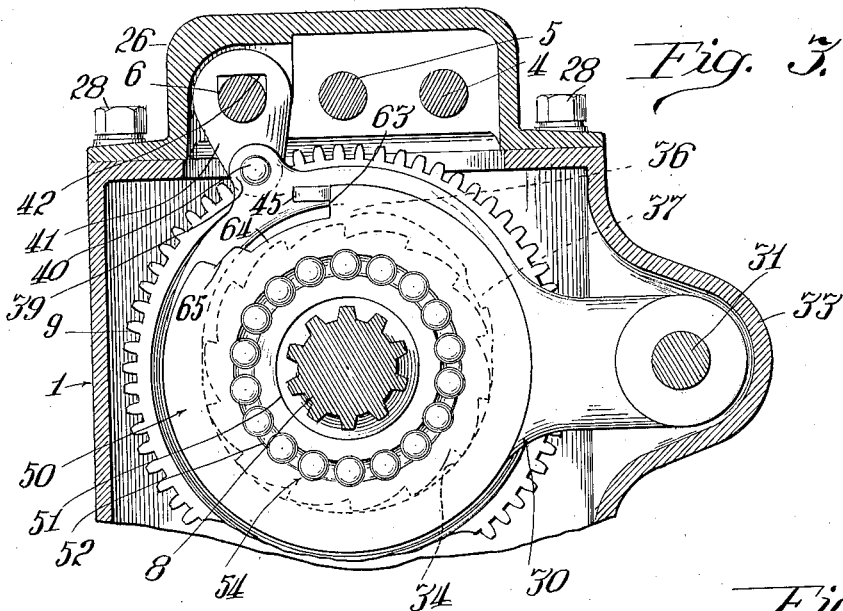
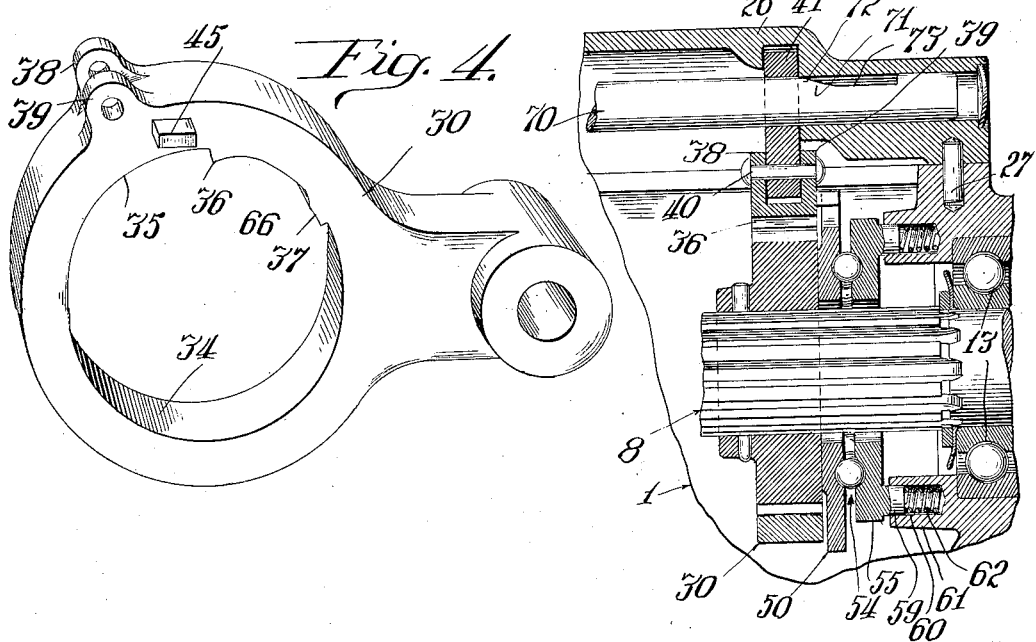
Inventor
Robert Lapsley
Witness Patented July 2, 1935

2,006,398

UNITED STATES PATENT OFFICE 2,006,398

MEANS FOR PREVENTING RETROGRADE MOTION OF AN AUTOMOBILE

Robert Lapsley, Berrien Springs, Mich., assignor to Clark Equipment Company, Buchanan, Mich., a corporation of Michigan Application September 28, 1929, Serial No. 395,799

16 Claims. (Cl. 192—4)

This invention relates to a means for preventing and automatically controlling retrograde motion of an automobile or other vehicles.

It is a well known fact that an automobile being driven up a slight incline will roll backward if its clutch is disengaged or its gears shifted to neutral. This necessitates an application of the brakes to check the backward movement of the car and prevent it damaging other cars which may happen to be behind it. This is a particular disadvantage when the automobile is being driven in heavy traffic and is stopped by traffic conditions, since under these conditions there are invariably cars immediately behind it.

The application of the brakes and necessity of holding them engaged until the car is started forward again makes the starting of the car more difficult and in the case of an inexperienced driver frequently results in a stopping of the engine and consequent tie-up in the traffic of that street.

Moreover this tendency of a car to roll backward when on an incline constitutes a hazard of considerable moment if the engine of the car is stopped on a steep hill, for under these circumstances extreme skill on the part of the driver is required to restart the motor and to restart the car up the hill.

In recognition of this difficulty and as a possible solution of it, devices have been made heretofore, of which I am aware, in which the automobile is definitely prevented from retrograde motion except when its gears are placed in position to drive it in a backward direction. That is, while the car is in neutral or one of its forward speeds, it is capable only of advancing and any tendency on the part of the car to roll backwards is stopped by the means employed to prevent retrograde motion of the car. In order to facilitate backing the car when it is necessary to do so, means are provided in connection with the gear shift and lever for shifting it such that the retrograde preventing device is disabled while the reverse gear is engaged.

This device, while it is of material benefit in that it prevents unwanted retrograde motion of the car, is subject to the serious criticism that in case the car has been shifted into reverse and started backward, and the reverse gear disengaged while the car is still moving backward, the retrograde preventing means immediately engages with the consequent jerking of the car; and in some instances this has resulted in damage to the gears of the car.

In my present invention I have provided a new and improved means for preventing retrograde motion of the car, a means which is normally effective when the car is in neutral or any of its forward speeds, and ineffective when the car is in reverse or in neutral following a movement in reverse. Under the latter circumstances, the retrograde motion preventing means is ineffective until the car has again been moved forward.

The addition of the device of my invention to an automobile adds no new functions or operations for the driver to perform but rather it is entirely automatic in its operation and its operation makes the driving of the car easier rather than more difficult.

A car equipped with the device of my invention and operating on an incline is positively prevented from rolling backward if the engine stops, or the gears are disengaged to bring the car to a halt under traffic conditions. The driver need not set the brakes to prevent the car from rolling backward and therefore can confine his entire attention to restarting his motor or restarting his car as the case may be.

Moreover, the device of my invention while it positively prevents retrogressive motion of the car when that motion is not wanted, instantly yields to a slight pressure on the gear shifting rod to shift the reverse gears into engagement, and that yielding disables the device.

The retrograde motion preventing device of my invention is applicable to trucks, tractors, shop tractors and the like, in fact to any automobile vehicle, whether it be driven by an internal combustion engine, a steam engine or an electric motor. In these latter types of vehicles, because of the absence of change of speed gears, the device of my invention may be connected to and operated by the reverser mechanism of the vehicle. Thus in a steam driven vehicle, the device may be associated with the Stevenson link, and in an electrical vehicle with the reverser switch. The invention has great utility in pleasure cars since it adds to the safety of those cars, particularly when they are driven by relatively inexperienced drivers. The device is also of great utility when applied to contractors' service trucks which are employed in the transportation of materials on a construction project because of the irregular roadway over which such vehicles must travel and the prevalence of grades in that roadway.

No additional effort is required on the part of the driver to shift into reverse because of the presence of the retrograde motion preventing device and disablement of it by the shift into reverse, since the disablement is effected by a movement of simple parts.

In the preferred embodiment of my invention I provide a ratchet wheel splined to the drive shaft of the car within the transmission housing, and a pawl arranged to engage the teeth of this wheel when the car starts in a reverse direction. This pawl is especially shaped so that when the car is being driven forward it will ride over the teeth of the ratchet wheel without making a noise. When the gears of the car are shifted into reverse, the pawl is lifted out of engagement with the ratchet wheel, and when the car is driven backward by the reverse gears, a locking device maintained in frictional engagement with the ratchet wheel is rotated to lock the pawl out of engagement with the teeth of that wheel. Should the reverse gears of the car be disengaged while the car is still moving backward, the lock prevents the pawl from re-engaging the teeth of the ratchet wheel. This arrangement permits the car to continue in a backward direction even after its reverse gears have been disengaged, this freedom to move backwards continuing until the car has been again moved forward at which time the lock is moved out of engagement with the pawl by its frictional engagement with the ratchet which is then moving in its forward direction.

Now to acquaint those skilled in the art with the teachings of my invention, reference is made to the accompanying drawings in which a preferred embodiment of it is illustrated by way of example, and in which:

Figure 1 is a side view of a transmission with a part of the casing cut away to disclose a part of the gears and the retrograde motion preventing device contained therein;

Figure 2 is a cross sectional view of Figure 1 taken substantially along the line 2—2 looking in the direction of the arrows.

Figure 3 is a cross sectional view of Figure 1 taken substantially along the line 3—3 also looking in the direction of the arrows;

Figure 4 is a perspective view of the pawl that engages the teeth of the ratchet wheel to prevent retrograde movement of the car;

Figure 5 is a perspective view of the lock for retaining the pawl disengaged from the ratchet; and Figure 6 is a cross sectional view of a different type of transmission showing the application of my device thereto.

Referring to the drawings now in more detail, the transmission casing 1 is formed in substantially the same manner as is customary in transmissions of this type, and houses the usual gears and shaft and levers employed in the control of the vehicle. Preferably this casing 1 is formed as an integral part of the clutch housing 2 and fitted in the vehicle immediately to the rear of the motor.

Because of the inclusion of the device of my invention in the transmission casing 1, it is necessary that that casing be slightly longer than the ordinary transmission casing, that is, the rear wall 3 is moved back sufficiently to permit the addition of my device in the casing.

The transmission shown in Figures 1 and 2 is a transmission of the five speed type in which there are four speeds forward and one in reverse. To control the gears of the transmission three shift rods 4, 5 and 6 are provided and the shift lever 7 arranged to selectively engage these rods to move them forward and backward to selectively engage the various gears of the transmission.

In transmissions of this type, the reverse rod, 6, moves in one direction only, and the forward speed rods 4 and 5 move both forward and backward.

In the transmission shown the shift rods 4, 5 and 6 are supported in the cover 26 which is aligned on the casing 1 by the dowel pins 27 and held thereon by a plurality of bolts 28. This or any other preferred type of construction can be employed in the manufacture of transmissions containing the device of my invention and the particular type illustrated is shown by way of example only.

Within the transmission casing is the drive shaft 8 with which the propeller shaft driving the vehicle is connected and upon which gears 9 and 10 are splined and adapted to be moved longitudinally of the shaft by the fork 11 engaging the shoulder 12 on those gears. This fork 11 is fastened on to one of the shift rods in such a manner that it may be controlled by a movement of the lever 7.

The particular arrangement of the gears and order of their movement to place the transmission in any one of its various speeds is not of the essence of the present invention as my invention can be employed in any existing type of transmission.

The drive shaft 8 projects rearwardly of the transmission and is supported by the bearing 13 disposed in a suitable recess 14 in the rear wall 3 of the transmission casing, that bearing being held therein by the flange 15 on the universal joint casing 16 which fits into and abuts against the rear wall 3 of the transmission casing.

The reverse gears 17 are adapted to be controlled by a spider arm 18 which is mounted upon and pinned to the shift rod and extended downward on one side of the drive shaft 8. In the five speed transmission shown, this spider arm 18 is moved forward to move the reverse gear 17 into engagement with gear 9.

In mounting my retrograde motion preventing means in the transmission casing I place the ratchet wheel 20 upon the splined portion of the shaft 8 and lock it against longitudinal movement on this shaft by a key 21 projecting through shoulder 22 of the ratchet wheel and engaging a keyway in the shaft. The wheel 20 is provided with teeth 23 which engage the splined portion of the shaft to prevent rotation of the ratchet wheel with respect to the shaft.

The ratchet wheel is also provided with a plurality of teeth 24 the radial face 25 of which trails behind the sloping face 26 as the ratchet is rotated by a forward movement of the car, that rotation being counter-clockwise as seen in Figure 2.

The pawl 30 is mounted upon the pivot rod 31 which is fitted into suitable bosses, not shown, provided in the projection 33 of the side wall of the transmission casing.

This pawl 30 is provided with a central generally circular opening 34 which fits around the ratchet wheel 20. Within this opening teeth 36 and 37 project, the former to engage the radial face 25 of the teeth of the ratchet wheel to prevent reverse rotation of the ratchet wheel, and the latter tooth 37 to ride over the sloping faces 26 of the teeth of the ratchet wheel to prevent the pawl from making a noise as the ratchet wheel is rotated by forward movement of the vehicle.

On the outside surface of the pawl 30 I provide ears 38 and 39 which form a support for the pivot 40 which projects therethrough to attach the link 41 to the pawl. This link projects upward and is provided with a circular opening 42 through which the reverse shift rod 6 is projected. The reverse shift rod 6 is provided with a cam-like portion 43 so located that when the rod is in its normal position as shown in Figure 1, the lever 41 rides down in the hollow part of the cam and permits the pawl 30 to rotate about its pivot 31 to bring the tooth 36 into engagement with the teeth of the ratchet 20. When the shift rod 6 is moved to its operative position to engage the reverse gears 17 of the transmission, the link 41 rides up over the high part 44 of the cam 43 to raise the pawl 30 and thereby bring the tooth 36 out of engagement with the teeth of the ratchet wheel.

In Figure 2 the pawl is shown in its raised position, that is with the link 41 disposed upon the high portion 44 of the cam 43.

The lower part of the opening 34 in the pawl 30 is shaped as the arc of a circle that is substantially concentric with the axis of the shaft 8 when the pawl is raised, and the teeth 24 of the ratchet wheel slide over this surface when the pawl is raised. The upper part of the opening 34 is extended at 35 to provide clearance around the teeth 36 and 37.

The pawl 30 is also provided with the projecting ear or boss 45 which cooperates with the locking disc 50 to hold the pawl in its raised position, in a manner that will be subsequently explained.

The locking disc 50 is provided with a circular central opening 51 which enables it to be fitted around the shaft 8 and to abut against the rear face of the ratchet wheel 20. The disc is also provided with the ball race 52 in which the balls of the thrust bearing 54 are fitted.

The stationary member 55 of this thrust bearing comprises a disc also having a central opening 56 to permit it to be fitted around the shaft 8.

A plurality of dowels 59 are attached to the stationary plate 55 and project into circular pockets 60 disposed in the flange 61 of the rear wall 3 of the transmission casing, the dowels preventing rotation of the stationary bearing member 55. Springs 62 disposed in the pockets 60 and bearing against the ends of the dowels 59 tension the bearing to thereby hold the locking disc 50 in frictional engagement with the rear face of the ratchet wheel 20.

The locking disc is provided with the radial shoulder 63 adjacent to the slotted portion 64, and with the shoulder 65 which forms a cam raised from the surface of the slotted portion 64.

As will best be seen in Figure 3, when the ratchet wheel 20 is rotated in a counter-clockwise direction as the drive shaft 8 is driving the vehicle forward the disc 50 through its frictional engagement with this ratchet is rotated counter-clockwise until the shoulder 63 strikes against the ear 45 on the pawl 30 to prevent further rotation of the disc. With the ear 45 in this position, the pawl is free to move up and down to permit its tooth 36 to engage the teeth 24 of the ratchet wheel. The width of the slot 64 is such that the ear 45 freely slides in and out of it.

When the car is shifted into reverse and the pawl lifted by a forward movement of the shift rod 6, ear 45 moves upward into the position in which it is shown in Figure 3. When the ratchet wheel 20 revolves in a clockwise direction as the vehicle is driven backward, the locking disc 50 is rotated clockwise by its frictional engagement with that ratchet, to bring the shoulder 65 under the lower surface of the ear 45, thereby locking the pawl in its nonoperating position independently of the link 41 and cam 43 engaged thereby. With the locking disc 50 in this position, the pawl is locked out of engagement with the teeth of the ratchet wheel so that backward movement of the vehicle may continue indefinitely. In order that the pawl may be returned to its operating position in which it is capable of engaging its tooth 36 with the teeth of the ratchet wheel to stop a backward movement of the car, it is necessary to again move the car forward so that the locking disc 50 may be rotated in a counter-clockwise direction by its frictional engagement with the ratchet 20 to move the shoulder 65 out from under the ear 45, that rotation of the disc 50 continuing until the ear 45 again strikes the radial shoulder 63.

The width of the slot 64 and the locking disc 50 is approximately equal to one and one-half times the circular pitch of the teeth on the ratchet wheel 20 so that the ratchet wheel must revolve in a clockwise direction for a distance greater than the circular pitch of its teeth before the shoulder 65 is brought into engagement with the under surface of the ear 45.

With the pawl 30 in its operating position, that is down with the tooth 36 capable of engaging the teeth of the ratchet wheel, the maximum reverse rotation that the ratchet wheel can make is approximately the width of one tooth, therefore under the circumstances in which the pawl is in its operating position, it is impossible for the vehicle to move backwards sufficiently far to rotate the locking disc sufficiently to bring the shoulder 65 under the ear 45, since the tooth 36 of the pawl will engage a tooth of the ratchet wheel and stop the retrograde motion. This insures that the pawl will be operatively engaged with the ratchet wheel to prevent retrograde motion of the car at all times except when the car is in reverse gear and immediately after that and before it has again been driven forward.

As will best be seen in Figure 2, when the ratchet wheel 20 is rotated in a counter-clockwise direction by the shaft 8 driving the car forward, the tooth 37 on the pawl 30 engages the sloping faces 26 of the teeth 24 and rides over those surfaces to raise the tooth 36 out of engagement with the teeth 24 of the ratchet. When the tooth 37 drops over the radial portion 25 of the ratchet teeth the ratchet tooth engages the sloping surface 66 of the tooth 37 permitting the pawl to descend slowly, that descent continuing until the opposite surface of the tooth 37 engages the sloping face 26 of the next ratchet wheel tooth.

By this arrangement when the car is running forward, the pawl rides over the teeth of the ratchet wheel without making an appreciable noise, thereby insuring that the operation of the car will not be made noisy because of the addition of the retrograde movement preventing device.

The transmission shown in Figures 1, 2 and 3, is a five speed transmission in which the separate reverse shift rod 6 is moved forward to engage the reverse gears of the transmission. In such a transmission the cam 43 on the shift rod is positioned with its low portion forward and its high portion 44 to the rear so that as the shift rod is moved forward the link 41 will ride up over the cam onto the higher portion of it to lift the pawl out of engagement with the ratchet wheel. In Figure 6 I have shown a portion of a transmission, in which the shift rod is moved to the rear, that is to the right in Figure 6, to engage the reverse gears of the transmission. In Figure 6 the rod 70 is shown in the position that it assumes when the reverse gear is engaged. The cam 71 is disposed with its high portion 72 ahead of its low portion 73 so that as the shift rod is moved backward the link 41 is raised from the low portion 73 to the high portion 72 of the cam.

The particular pawl and link arrangement shown in the drawings is shown by way of example only as there are many modifications in the design of these parts that can be made within the teachings of my invention, and I am not therefore to be limited to the specific details shown. The invention is applicable to any transmission and any one of a large number of specific arrangements may be employed in that application. However, I prefer to lift the pawl by the link 41 as shown in the drawings since it is desirable that the addition of the retrograde preventing device be designed so that its inclusion in the transmission adds nothing to the operating routine of the car. By providing the link 41 cammed onto the shift rod 6 and employing that link to raise the pawl 30 in the manner shown, the pawl can be thrown out of engagement with the teeth of the ratchet wheel without adding any appreciable drag on the gear shift lever 7 as the car is being thrown into reverse. That is, the link 30 being pivoted to move freely can be easily raised by the cam on the gear shift rod 6 and the force required to raise this link is so small that an only inappreciable load is added to the gear shift rod lever 7.

Having thus complied with the statutes and shown and described a preferred embodiment of my invention, what I consider new and desire to have protected by Letters Patent is pointed out in the appended claims.

What is claimed is:

1. In a motor vehicle, a shaft normally rotatable in one direction and prevented from rotating in the opposite direction by a ratchet on the shaft and a pawl engaged thereby, means for disengaging said pawl to permit rotation of said shaft in the opposite direction, and means controlled by a rotation of such shaft in said opposite direction for locking said pawl disengaged from said ratchet until the shaft is again rotated in said one direction.

2. In combination with a shaft driven forward by gears, a reverse gear adapted to drive said shaft in a reverse direction, a rod shifted endwise to engage said reverse gear with said shaft, a ratchet wheel on said shaft, means cooperating therewith to prevent a reverse direction rotation of the wheel and shaft, a lever moved by said rod when it is moved to engage said reverse gears with said shaft to disengage said cooperating means to permit a reverse rotation of said shaft, and means for locking said cooperating means disengaged independently of said lever.

3. In a motor driven vehicle having a transmission provided with driving and driven parts operable in neutral and forward and reverse directions for the control of the vehicle, one of said parts including a shaft for driving the vehicle, means for preventing retrograde movement of the vehicle when said transmission is in its neutral or forward positions, means for permitting retrograde movement of the vehicle when said transmission is in its reverse position, and means in frictional engagement with one of the driven parts for causing said last means to continue to be effective until the shaft rotates in a forward direction.

4. In a transmission, a shaft driven thereby to drive a vehicle, gears cooperating with the shaft to drive it in a forward direction, other gears cooperating therewith to drive it in a reverse direction, selective means controlling said gears, a ratchet on said shaft, a pawl arranged to engage said ratchet to prevent rotation of said shaft in a reverse direction, means controlled by said selective means for disengaging said pawl to permit reverse rotation of the shaft, and means controlled by that reverse rotation for holding said pawl disengaged until the shaft is again driven forward.

5. In a motor driven vehicle, a transmission casing, a drive shaft projecting through one wall thereof, gears within said casing arranged to be selectively controlled to drive said shaft in forward and reverse directions, shift rods for controlling said gears, one of said rods being moved longitudinally to connect the reverse gears with said shaft, a ratchet wheel splined to said shaft, a pawl pivoted to the wall of said casing and engaging the teeth of said ratchet wheel to prevent reverse rotation of said shaft, a lever pivoted to said pawl and engaging a cam on said shift rod and lifted thereby to disengage the pawl when said rod is moved to connect the reverse gears to said shaft, a cam loosely fitted on said shaft and rotatable thereabout, a thrust bearing having a stationary member disposed on the wall of said casing through which said shaft projects concentrically of said shaft and a movable member holding said cam in frictional engagement with said ratchet, said cam being rotated by a reverse rotation of said ratchet, to hold the pawl out of engagement therewith independently of said lever and rotated by a subsequent forward movement of the ratchet to reengage the pawl with the ratchet.

6. In a motor driven vehicle, the combination of a transmission having gears selectively engaging a shaft to drive the vehicle in forward and reverse directions, with a pawl and ratchet for preventing a reverse movement of said vehicle while said gears are set to drive it forward, means for disengaging said pawl from said ratchet when said gears are set to drive the vehicle in a reverse direction, and a collar loosely fitted around said shaft and rotated by a reverse movement thereto to lock said pawl disengaged from said ratchet independently of said gears and rotated by a forward movement of the shaft to unlock the pawl and reengage it with the ratchet.

7. In a motor driven vehicle, the combination of a transmission having gears selectively engaging a shaft to drive the vehicle in forward and reverse directions, with a pawl and a ratchet for preventing a reverse movement of the vehicle when said gears are set to drive it forward, means for disengaging said pawl from said ratchet when said gears are set to drive the vehicle in a reverse direction, a collar loosely fitted around said shaft and held in frictional engagement with said ratchet, an ear on said pawl, and a cam on said collar brought into engagement with said ear when said collar is rotated by a reverse movement of said vehicle to maintain the pawl disengaged from the ratchet until the shaft rotates in a forward direction.

8. The combination of a shaft having a ratchet wheel mounted thereon, said ratchet wheel having a plurality of teeth, with a pawl having two teeth one of which engages the teeth of said ratchet during a normal rotation of the shaft to hold the other pawl tooth disengaged from the ratchet teeth, and said other pawl tooth engaging a tooth of the ratchet to prevent a rotation of the shaft in a direction opposite to said normal rotation.

9. The combination of a shaft having a ratchet wheel mounted thereon, said ratchet wheel having a plurality of teeth, with a pawl having two teeth one of which engages the teeth of said ratchet during a normal rotation of the shaft to hold the other pawl tooth disengaged from the ratchet teeth, and said other pawl tooth engaging a tooth of the ratchet to prevent a rotation of the shaft in a direction opposite to said normal rotation, and means for holding said pawl out of engagement with said ratchet to permit it to rotate in a direction opposite to its normal rotation.

10. The combination of a shaft having a ratchet wheel mounted thereon, said ratchet wheel having a plurality of teeth, with a pawl having two teeth, one of which engages the teeth of said ratchet during a normal rotation of the shaft to hold the other pawl tooth disengaged from the ratchet teeth, and said other pawl tooth engaging a tooth of the ratchet to prevent a rotation of said shaft in a direction opposite to its normal rotation, means for holding said pawl out of engagement with said ratchet to permit the shaft to rotate in a direction opposite to its normal rotation, and means controlled by said latter rotation for locking said pawl disengaged until said shaft is again rotated in its normal direction.

11. In a motor vehicle, a transmission casing containing a shaft which projects through one of its walls, a plurality of gears for rotating said shaft, a ratchet rigidly attached to said shaft, a pawl normally engaging said ratchet to prevent a rotation of said shaft in one direction, means for disengaging said pawl to permit rotation of said shaft in said one direction, and means disposed concentrically around said shaft between said ratchet and casing wall for holding said pawl disengaged.

12. In a motor vehicle, a transmission casing containing a shaft which projects through one of its walls, a plurality of gears for rotating said shaft, a ratchet wheel disposed within said casing and rigidly attached to said shaft, a pawl normally engaging said ratchet wheel to prevent a rotation of said shaft in one direction, means for disengaging said pawl to permit rotation of said shaft in said one direction, and a locking disc concentrically disposed around said shaft in frictional engagement with said ratchet for holding said pawl disengaged.

13. In a motor vehicle, a transmission casing containing a shaft which projects through one of its walls, a plurality of gears for rotating said shaft, a ratchet wheel rigidly attached to said shaft, a pawl normally engaging said ratchet to prevent a rotation of said shaft in one direction, means for disengaging said pawl to permit rotation of said shaft in said one direction, and a locking disc concentrically disposed around said shaft in frictional engagement with said ratchet and rotated thereby to hold said pawl disengaged.

14. In a motor vehicle, a transmission casing containing a shaft which projects through one of its walls and a plurality of gears for rotating said shaft, a ratchet wheel disposed within said casing and rigidly attached to said shaft, a pawl normally engaging said ratchet to prevent a rotation of said shaft in one direction, means for disengaging said pawl to permit rotation of said shaft in said one direction, an ear on said pawl, a locking disc held in frictional engagement with said ratchet and arranged to be rotated by a rotation of it in said one direction to engage said ear and thereby hold said pawl disengaged.

15. In a motor vehicle, a transmission casing containing a shaft which projects through one of its walls and a plurality of gears for rotating said shaft, a ratchet wheel disposed within said casing and rigidly attached to said shaft, a pawl normally engaging said ratchet to prevent a rotation of said shaft in one direction, means for disengaging said pawl to permit rotation of said shaft in said one direction, a locking disc disposed around said shaft, a ball race in one face of said disc, a second ball race held stationary by dowels projecting into pockets in said casing wall, springs engaging said dowels, balls in said races, said springs and balls cooperating to hold said gears in frictional engagement with said ratchet, said disc being rotated by a rotation of said ratchet in said one direction, and means on said pawl engaged by said rotated disc to hold the pawl disengaged from said ratchet.

16. In a motor vehicle, the combination of a transmission having gears selectively engaging a shaft to drive the vehicle in forward and reverse directions, with means including a member immovably fastened on said shaft and a movable member cooperating therewith for preventing reverse movement of the vehicle when the gears are set to drive it forward, means actuated by a setting of said gears to drive the vehicle in a reverse direction for moving said movable member out of cooperative relation with said shaft member, and means controlled by a reverse movement of the vehicle for holding said movable member out of cooperative relation with said shaft member until the shaft rotates in a forward direction.

ROBERT LAPSLEY.